S. S. RIEGEL.
CAR TRUCK.
APPLICATION FILED JUNE 1, 1914.

1,120,407.

Patented Dec. 8, 1914.

S. S. RIEGEL.
CAR TRUCK.
APPLICATION FILED JUNE 1, 1914.

1,120,407.

Patented Dec. 8, 1914.
7 SHEETS—SHEET 3.

WITNESSES
Edward H. Wright
S. R. Bell.

INVENTOR
Samuel S. Riegel,
by Snowden Bell, Atty

S. S. RIEGEL.
CAR TRUCK.
APPLICATION FILED JUNE 1, 1914.

1,120,407.

Patented Dec. 8, 1914.

UNITED STATES PATENT OFFICE.

SAMUEL S. RIEGEL, OF SCRANTON, PENNSYLVANIA.

CAR-TRUCK.

1,120,407. Specification of Letters Patent. Patented Dec. 8, 1914.

Application filed June 1, 1914. Serial No. 842,040.

*To all whom it may concern:*

Be it known that I, SAMUEL S. RIEGEL, of Scranton, in the county of Lackawanna and State of Pennsylvania, have invented a certain new and useful Improvement in Car-Trucks, of which improvement the following is a specification.

The object of my invention is to provide a truck for railroad vehicles, which shall be of simple and inexpensive construction, readily produced in cast steel; in which the transverse rigidity shall be superior to that of the ordinary forms; the advantage, as to low cost, of the arch bar type, be combined with the freedom of action of the equalizer type; the proportion of weight of the truck structure carried by the springs be made as large as practicable and therefore rendered easier on the track by being cushioned; and ready access for renewal of parts be afforded.

The improvement claimed is hereinafter fully set forth.

In the accompanying drawings.

Figures 1, 2, 3:
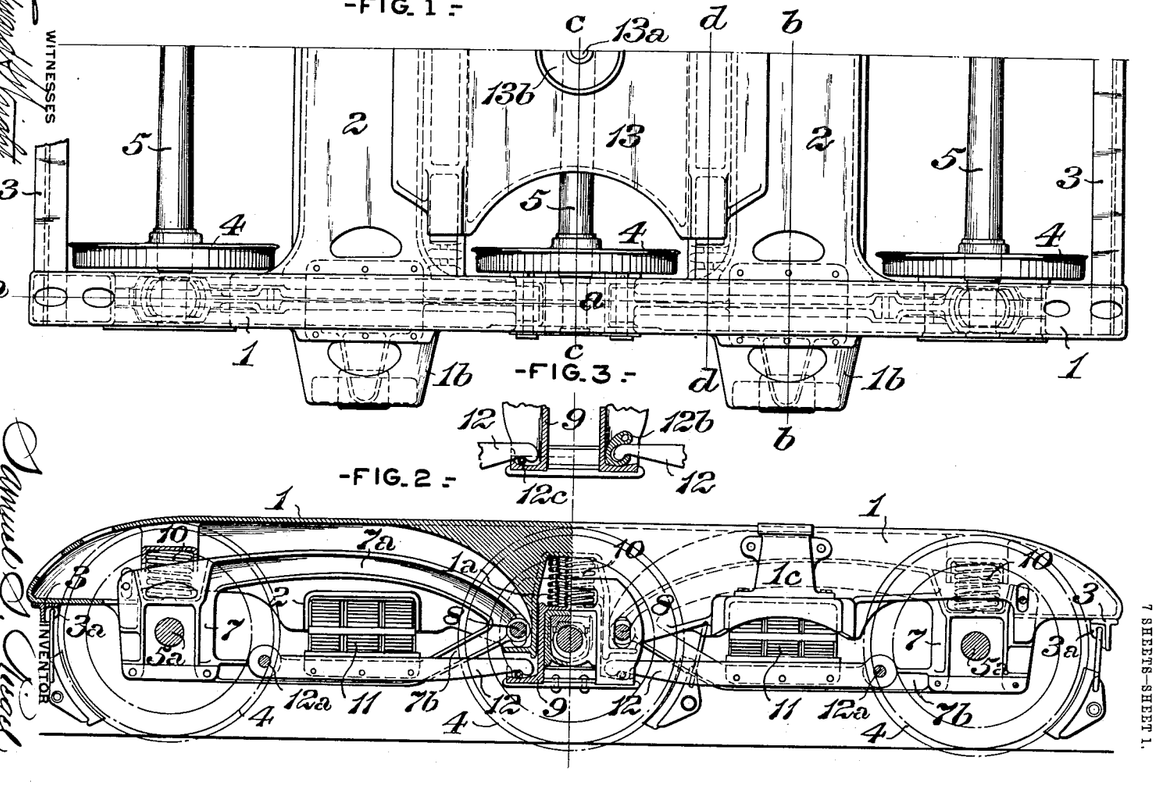
Figure 1 is a half plan view of a six wheel car truck, illustrating an embodiment of my invention.
Fig. 2, a view, the right hand half of which shows a side elevation of the truck of Fig. 1, and the left hand half, a vertical longitudinal section, on the line $a\ a$ of the same figure, with the pedestal and pedestal arms shown in elevation.
Fig. 3, a vertical longitudinal section through the lower portions of a pair of the middle pedestals.
Figure 4:
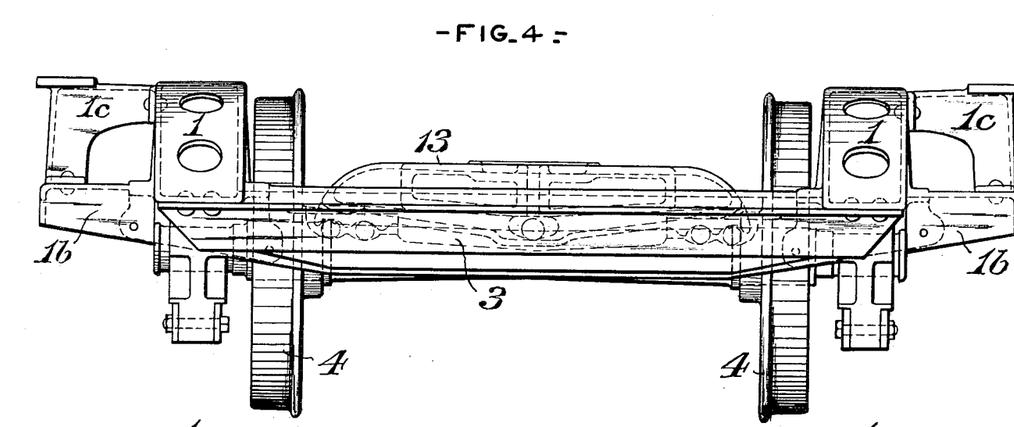
Fig. 4, an end view, in elevation.
Figure 5:
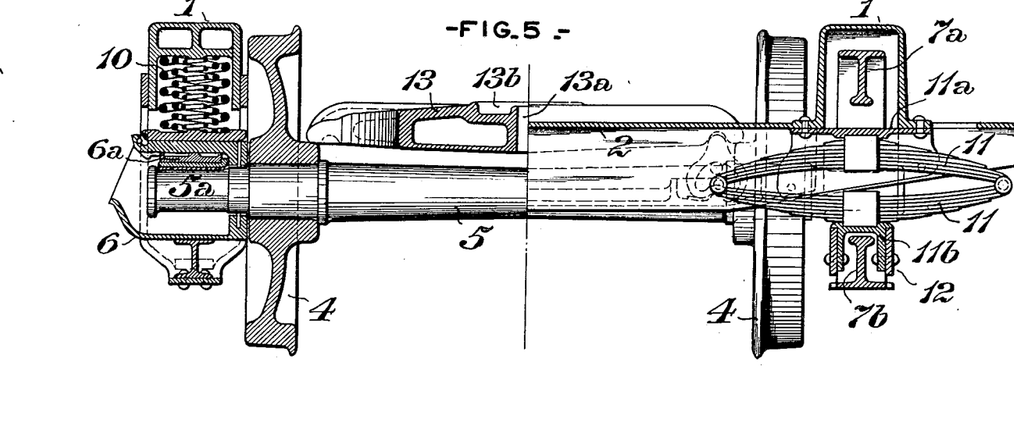
Fig. 5, a view, the right hand half of which is a vertical transverse section on the line $b\ b$ of Fig. 1, and the left hand half, a similar section on the line $c\ c$ of the same figure.
Figure 6:
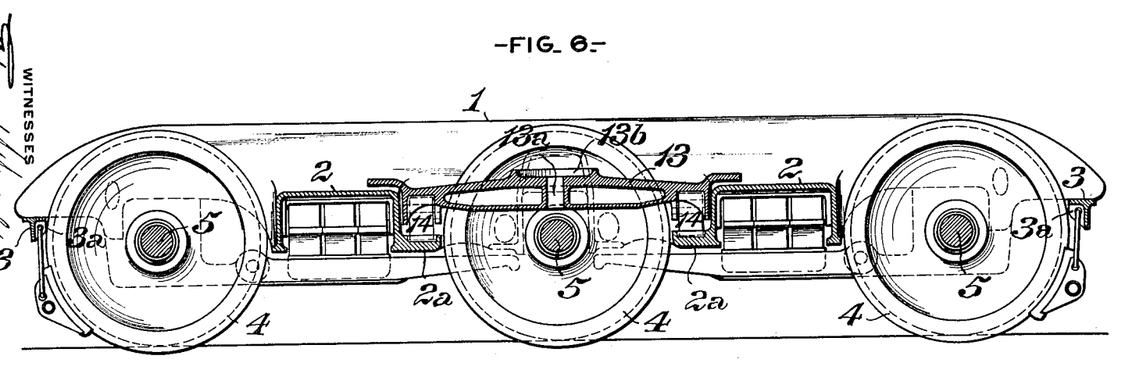
Fig. 6, a vertical longitudinal central section.
Figure 7:
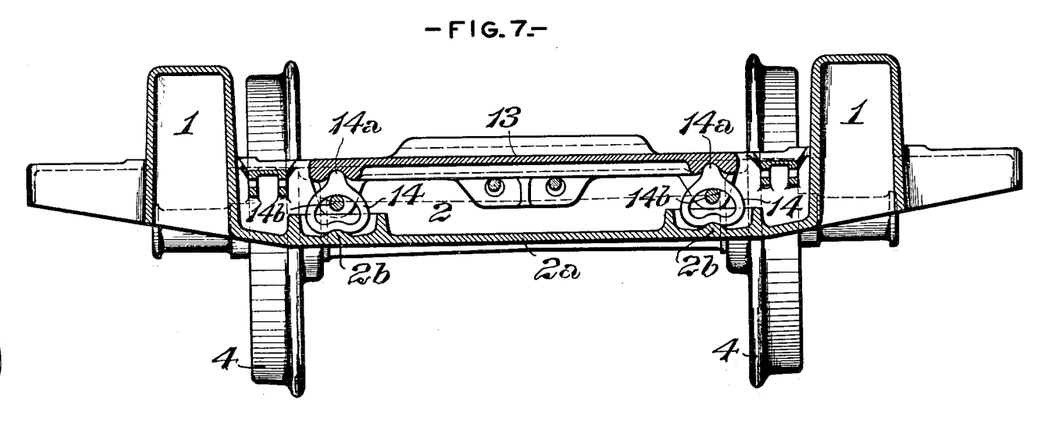
Fig. 7, a vertical transverse section, on the line $d\ d$ of Fig. 1.
Figure 10:
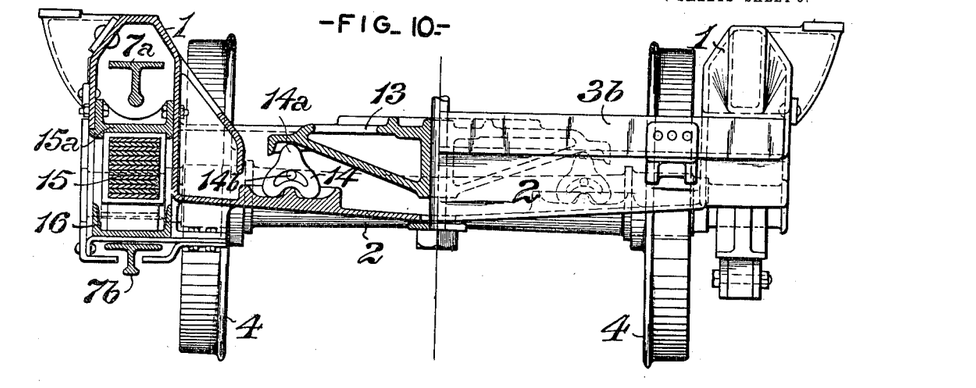
Fig. 10, a view, the right hand half of which shows an end view, and the left hand half, a vertical transverse section, taken on the line $f\ f$, of the truck of Fig. 8.
Figure 11:
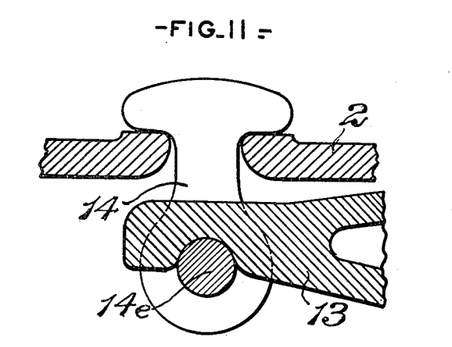
Figs. 11, 12, 13, 14, detailed sectional views, on an enlarged scale, of different forms of bolster rockers.
Figure 12:
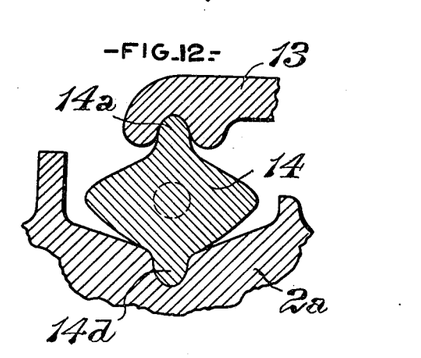
Figure 13:
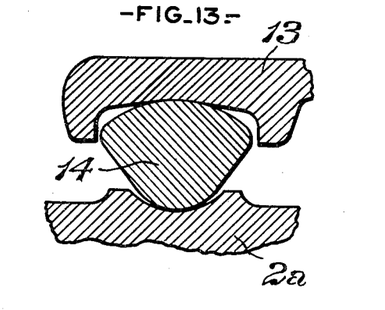
Figure 14:
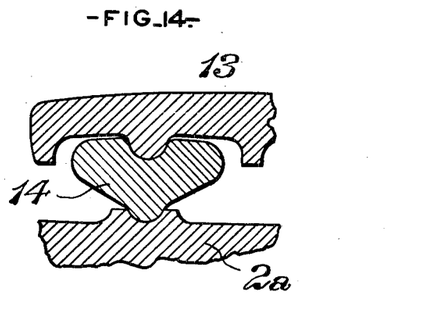

Referring first to Figs. 1 to 7 inclusive, in the practice of my invention, I provide an integral truck frame, preferably formed of cast steel, the members of which are composed of webs of comparatively light plate section, and which comprises two side members, 1, 1, the webs of which are disposed to form hollow beams, which are preferably of inverted U or channel section, and two transoms, 2, 2, which are also hollow beams, and are preferably of inverted U or channel section. The transoms, which are provided with lower bearing plates, $2^a$, on one side, connect the inner webs of the side members, on opposite sides of the middle transverse plane of the truck, and are spaced sufficiently far apart to admit between them a bolster hereinafter described. The side members are also connected, at their ends, by cross ties, 3, which are preferably, as shown, of T section, and which carry lugs, $3^a$, for the connection of brake hangers. The truck is supported on wheels, 4, fixed upon axles, 5, the journals, $5^a$, of which rotate in journal bearings, $6^a$, secured in journal boxes, 6, which are fitted in pedestals located in the side members of the frame, and vertically movable, relatively thereto, as presently to be described. The pedestals, 7, of the two end axles, are provided with integral upper arms, $7^a$, and lower arms, $7^b$, which project toward the middle transverse plane of the truck, adjacent to which they are coupled to downwardly projecting portions of the side members, by horizontal pivots, 8, or by being provided with pivotal ends engaging sockets in the side members, each of the end pedestals being thereby adapted to swing in a vertical plane about the axis of its pivot. The pedestals, 9, of the middle axle, are fitted between jaws, $1^a$, projecting downwardly from the tops of the side members, 1. It will be noted that as the pedestal arms are disposed between, and adjacent to, the vertical webs of the side members, they are guided in their swinging movements by said webs, and prevented from accidental lateral displacement. Helical springs, 10, are interposed between the pedestals of all the axles and the side members, and additional spring support for the truck frame on the end axles is provided by transversely disposed plate springs, 11, which are interposed between upper seats, 11$^a$, fixed to the side members, 1, and transoms, 2, and lower seats, 11$^b$, secured to equalizers, 12, which are coupled by pivot pins, 12$^a$, to the lower arms, 7$^b$, of the end pedestals, adjacent to said pedestals, and are pivotally supported, at their opposite ends, on the side members of the frame. In the instance illustrated, this support is effected through the pedestals, 9, of the middle axle, to which the equalizers may be coupled either by means of links, 12$^b$, pivoted to the pedestals, and engaging the ends of the equalizers, or by rollers, 12$^c$, seated on the pedestals and similarly engaging the equalizers, as shown in Figs. 2 and 3. The springs, 11, may be descriptively termed "recovery" or equalization springs, as they act to cause the end pedestals to recover, or return to, their normal positions, when swung upwardly on their pivots, 8. The capacity of lateral motion is afforded by a transversely extending bolster or swing beam, 13, having a central perforation, 13$^a$, for a center pin, and a bearing, 13$^b$, surrounding it, for a lower center plate, said bolster being supported on the bearing plates, 2$^a$, of the transoms, 2, by rockers, 14, which may be of any of the forms shown in Figs. 7 and 10 to 14 inclusive, of the drawings; of the ordinary three point suspension type; or of any other suitable and preferred known form by which resistance of superimposed weight is opposed to the movement of the bolster transversely to the truck. As shown in Figs. 7, 10 and 12, the rockers are provided with central journals, 14$^a$, on their tops, which fit correspondingly recessed bearings in the bolster, and, as shown in Figs. 7 and 10, are coupled to lugs on the bolster by pins, 14$^b$, passing through openings in the rockers, which permit their free swinging movements on bearings, 2$^b$, on the bearing plates. As shown in Fig. 11, the rocker passes through and swings in an opening in a transom, 2, and supports the bolster, 13, on a lower pin, 14$^e$. Fig. 12, shows a rocker as provided with an upper journal, 14$^a$, fitting a bearing on the bolster, and a lower journal, 14$^d$, fitting a bearing on the bearing plate. Fig. 13 shows the top of the rocker as convex throughout and without a projecting journal, and fitting a bearing of different concavity in the bolster, and substantially similarly disposed relatively to the bearing plate. In the form shown in Fig. 14, the relation of the rocker journals and bolster bearing is reversed, as compared with that in Figs. 7, 10 and 12. Lateral projections, 1$^b$, are formed on the side members of the truck frame, and standards, 1$^c$, for the support of side bearings of any preferred form, are fitted on said projections and secured thereto and to the side members.

Figure 8:
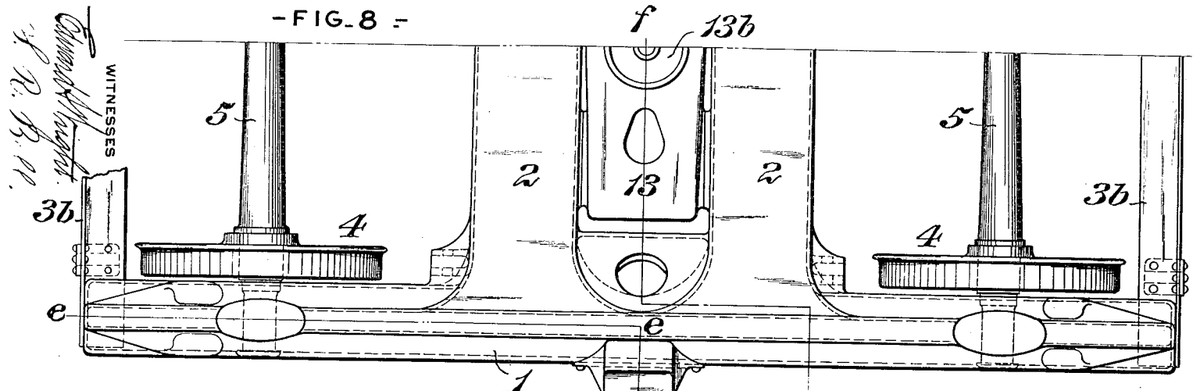
Fig. 8, a half plan view of a four wheel car truck embodying my invention.
Figure 9:
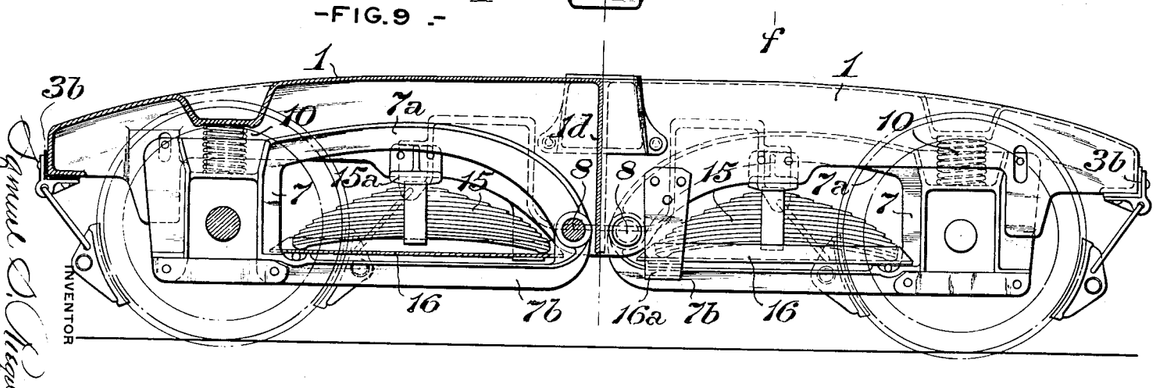
Fig. 9, a view, the right hand half of which shows a side elevation of the truck of Fig. 8, and the left hand half, a vertical longitudinal section, on the line $e\ e$ of the same figure, with the pedestal and pedestal arms shown in elevation.

Figs. 8 to 10 inclusive illustrate a structural modification in which my invention is embodied in a four wheel truck. There being, in this case, no pedestals for a middle axle, vertical plates, 1$^d$, are formed at the middle of the side members, 1, of the frame, instead of the jaws, 1$^a$, of the construction first described. The side members are connected by integral transoms, 2, 2, and by end cross ties, 3$^b$, which are, in this case, shown in the form of angle irons. The journal boxes, which are similar to those of said construction and are not shown, are similarly fitted in pedestals, 7, located adjacent to the ends of the side members, 1, and similarly movable vertically relatively thereto, having similar integral upper arms, 7$^a$, and lower arms, 7$^b$, which project toward the middle transverse plane of the truck, adjacent to which they are supported on downward projections on the side members, by horizontal pivots, 8, each of the pedestals being thereby adapted to swing in a vertical plane about the axis of its pivot. Helical springs, 10, are, as in the construction first described, interposed between the pedestals and the side members, and additional spring support for the truck frame on the axles is provided by longitudinally extending recovery springs, 15, of the plate type, each of which is interposed between a central seat, 15$^a$, secured to one of the side members and a spring plank, 16, on which the spring bears at each of its ends, and, which, in turn, bears on a supporting bracket, 16$^a$, secured to the side member. The lateral motion bolster, 13, is substantially similar to that first described, and is similarly supported on the transoms, 2, by rockers, 14.

Figure 15:
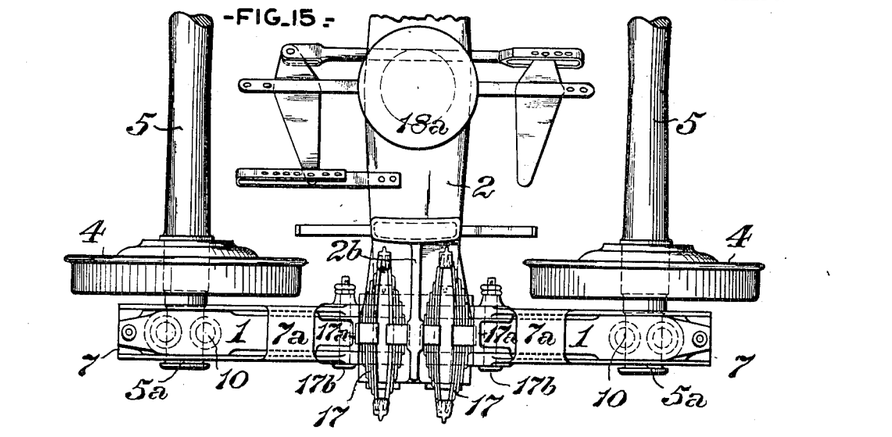
Fig. 15, a half plan view of a four wheel truck, illustrating a structural modification.
Figure 16:
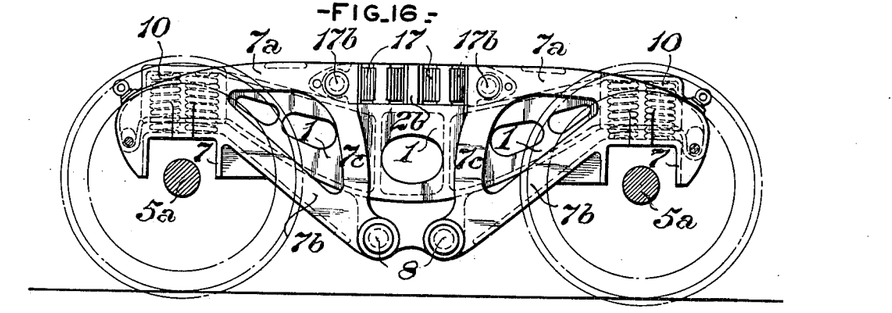
Fig. 16, a side view, in elevation, of the same.
Figure 17:
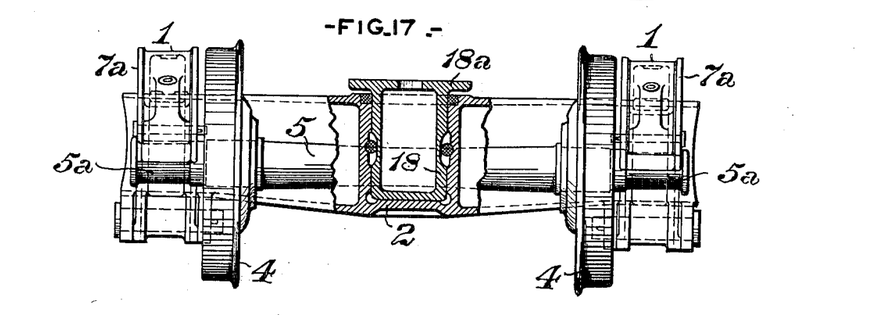
Fig. 17, an end view, partly in transverse central section.

Figs. 15 to 17 inclusive, illustrate another structural modification, in which my invention is embodied in a four wheel truck. The frame, in this instance, comprises two side members, 1, 1, of hollow rectangular section, and a single middle transom, 2, connecting and formed integral with, the side members. The journal boxes, (not shown) are fitted in pedestals, 7, which, similarly to those of the constructions before described are formed integral with upper arms, 7$^a$, and and lower arms, 7$^b$. The pedestal arms are, in this case, connected by intermediate arms, 7$^c$, and each pedestal is provided with two sets of arms, which extend on opposite sides of the side member, 1, to which the pedestal is connected, and, as in the instances before described, are movable vertically relatively thereto, the pedestal arms being coupled to downward projections on the side members, 1, by horizontal pivots, 8, located adjacent to the middle transverse plane of the truck. Helical springs, 10, are interposed between the pedestals and the side members of the frame, and resistance to the upward movements of the pedestals about the axes of their pivots, 8, is exerted by pairs of transversely extending recovery springs, 17, of the plate type, which abut against bearings on vertical flanges, 2ᵇ, extending transversely on the transom, 2, and side members, 1, and against spring seats, 17ª, coupled by transverse pivots, 17ᵇ, to the upper arms, 7ª, of the pedestals. A center casting, 18, having a lower center plate, 18ª, on its top, is fitted, centrally in the transom, 2.

Figure 18:
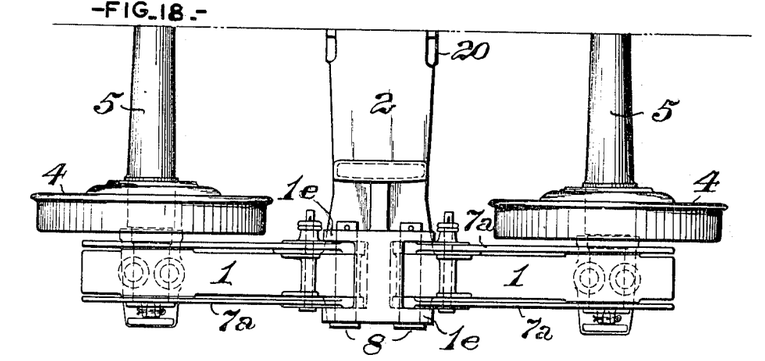
Fig. 18, a half plan view of a four wheel truck, illustrating another structural modification.
Figure 19:
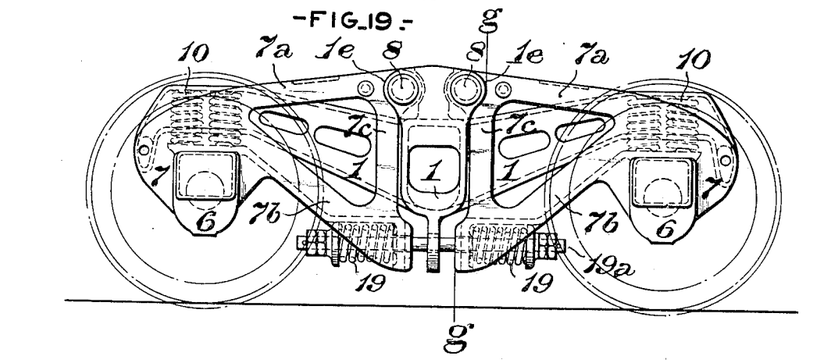
Fig. 19, a side view, in elevation, of the same; and, Fig. 20, a vertical transverse section, on the line $g\ g$ of Fig. 19.
Figure 20:
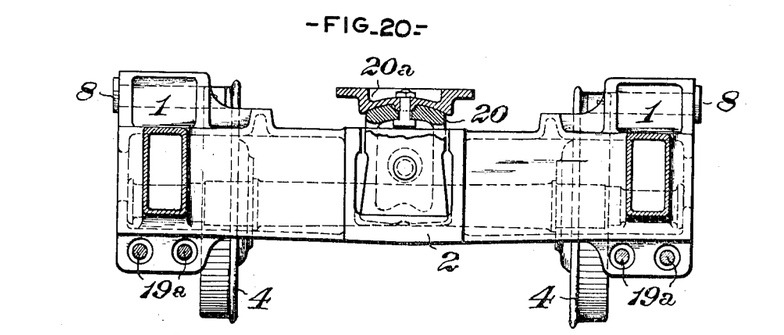

The further structural modification of my invention, as embodied in a four wheel truck, which is shown in Figs. 18 to 20 inclusive, accords, in all substantial particulars, with the construction last hereinbefore described, differing therefrom in the minor details of location of the pedestal pivots, form and location of the recovery springs, and manner of fitting the center casting. The pedestal pivots, 8, are, in this instance, located at the junctions of the upper and intermediate arms of the pedestals, and are socketed in lugs, 1ᵉ, on the tops of the side members, instead of in the lower portions thereof as in the constructions previously described. The journal boxes, 6, are formed integral with the pedestals, 7, and pedestal arms, 7ª, 7ᵇ and 7ᶜ. The recovery springs, 19, are of the helical type and are disposed longitudinally in pairs, between the members of each pair of lower pedestal arms, 7ᵇ, being coiled on rods, 19ª, and bearing on washers on said rods and on seats at the lower ends of the arms, 7ᵇ. The center casting, 20, is in the form of a saddle which fits over the central portion of the transom, 2, and carries a detachable lower center plate, 20ª, on its top.

I claim as my invention and desire to secure by Letters Patent:

1. In a car truck, a frame comprising two hollow beam side members, each having downward projections which are socketed for the reception of pedestal pivots adjacent to its middle transverse plane, and one or more connecting transoms.

2. In a car truck, the combination of a frame comprising side members and one or more connecting transoms, and pedestals pivotally connected to the side members of the frame adjacent to its middle transverse plane, with the capacity of independent vertical movement relatively to said frame.

3. In a car truck, the combination of a frame comprising side members and one or more connecting transoms, pedestals having arms extending longitudinally in the direction of the middle transverse plane of the frame, and horizontal pivots coupling said arms to the side members thereof.

4. In a car truck, the combination of a frame comprising side members having vertical and horizontal webs disposed to form hollow beams, and one or more connecting transoms; pedestals having arms extending longitudinally in the direction of the middle transverse plane of the truck, adjacent to the vertical webs of the side members and guided against lateral movement by said webs; and horizontal pivots coupling said arms to the side members.

5. In a car truck, the combination of a frame comprising side members and one or more connecting transoms, pedestals pivotally connected to the side members of the frame adjacent to its middle transverse plane, with the capacity of independent vertical movement relatively to said frame, and springs opposing resistance to upward movement of the pedestals.

6. In a car truck, the combination of a frame comprising side members and one or more connecting transoms, pedestals having arms extending longitudinally in the direction of the middle transverse plane of the frame, horizontal pivots coupling said arms to the side members thereof, and springs interposed between said arms and the side members.

7. In a car truck, the combination of a frame comprising side members and one or more connecting transoms, pedestals pivotally connected to the side members of the frame adjacent to its middle transverse plane, with the capacity of independent vertical movement relatively to said frame, journal boxes fitted in said pedestals, and springs interposed between the pedestals and the side members of the frame.

8. In a car truck, the combination of a frame comprising side members and one or more connecting transoms, pedestals pivotally connected to the side members of the frame adjacent to its middle transverse plane, with the capacity of independent vertical movement relatively to said frame, journal boxes fitted in said pedestals, springs interposed between the pedestals and the side members of the frame, and recovery springs interposed between the pedestals and said side members.

9. In a car truck, the combination of a frame comprising side members and one or more connecting transoms, a pedestal comprising a pair of jaws adapted to receive a journal box between them and integral upper and lower arms extending longitudinally in the direction of the middle transverse plane of the frame, and a horizontal pivot coupling said arms to one of the side members.

10. In a car truck, the combination of a frame comprising side members and one or more connecting transoms, a pedestal comprising a pair of jaws adapted to receive a journal box between them and integral upper and lower arms extending longitudinally in the direction of the middle transverse plane of the frame, a horizontal pivot coupling said arms to one of the side members, and a spring interposed between one of said arms and said side member.

11. In a car truck, the combination of a frame comprising two side members and one or more connecting transoms, a pedestal comprising a pair of jaws adapted to receive a journal box between them and integral upper and lower arms extending longitudinally in the direction of the middle transverse plane of the frame, a journal box, fitted in said pedestal, a horizontal pivot coupling said arms to one of the side members, a spring interposed between the pedestal and said side member, and a recovery spring interposed between one of the pedestal arms and said side member.

12. In a car truck, the combination of a frame comprising two hollow beam side members and one or more connecting transoms, pedestals having arms extending longitudinally in the direction of the middle transverse plane of the frame and adjoining the vertical webs of the side members, and horizontal pivots extending through said webs and coupling the arms of the pedestals thereto.

13. In a car truck, the combination of a frame comprising side members and one or more connecting transoms, a pedestal pivotally connected to one of the side members of the frame adjacent to its middle transverse plane, with the capacity of vertical movement relatively to said frame, and an equalizer pivotally connected to the pedestal and transmitting pressure to the side frame.

14. In a car truck, the combination of a frame comprising side members and one or more connecting transoms, a pedestal pivotally connected to one of the side members of the frame adjacent to its middle transverse plane with the capacity of vertical movement relatively to said frame, an equalizer pivotally connected to the pedestal and transmitting pressure to the side frame, and a recovery spring interposed between the equalizer and the truck frame.

15. In a car truck, the combination of a frame comprising side members and one or more connecting transoms, pedestals pivotally connected to the side members of the frame adjacent to its middle transverse plane, with the capacity of independent vertical movement relatively to said frame, journal boxes fitted in said pedestals, springs interposed between the pedestals and the side members, equalizers pivotally connected to the pedestals and transmitting pressure to the side frames, and recovery springs interposed between the equalizers and the truck frame.

16. In a car truck, the combination of a frame comprising side members and one or more connecting transoms, journal boxes fitted in pedestals in the middle transverse plane of the frame, a wheeled axle rotating in said journal boxes, end pedestals located adjacent to the ends of the side members and pivotally connected to said members adjacent to the middle transverse plane of the frame, with the capacity of vertical movement relatively to said frame, journal boxes fitted in said end pedestals, wheeled axles rotating in said journal boxes, equalizers pivotally connected to the pedestals and transmitting pressure to the side frames, and recovery springs interposed between the equalizers and the truck frame.

SAMUEL S. RIEGEL.

Witnesses:
NICHOLAS KLEIN,
ALVIN M. POWELL.